March 10, 1936.  A. G. ROSE  2,033,789
TOFFEE CUTTING MECHANISM
Filed Aug. 1, 1935  3 Sheets-Sheet 3

INVENTOR
Alfred German Rose
by Byrnes, Stebbins & Blenko
his attorneys

Patented Mar. 10, 1936

2,033,789

UNITED STATES PATENT OFFICE 2,033,789

TOFFEE CUTTING MECHANISM

Alfred German Rose, Gainsborough, England, assignor to Rose Brothers (Gainsborough) Limited, Gainsborough, England, a British company Application August 1, 1935, Serial No. 34,199
In Great Britain May 5, 1934

9 Claims. (Cl. 107—21)

This invention is for improvements in or relating to mechanism for feeding and cutting a bar of plastic toffee or like material, and has for its object to enable such mechanism to operate at a higher speed than has hitherto been possible.

According to the present invention, mechanism for feeding and cutting a bar of plastic toffee or the like (herein termed "stock") comprises means for continuously advancing the bar of stock into a cutting position, a cutting edge movable transversely of the bar for cutting off a length of stock and means for advancing the cutting edge longitudinally of the bar, and in the same direction as its direction of movement, during the cutting operation. The cutting edge is preferably moved longitudinally at the same speed as the bar of stock. It will be seen that, by such an arrangement, it is unnecessary to arrest the movement of the bar at each cutting operation.

The cutting edge is preferably afforded by a knife rotating about an axis parallel to the bar of stock and is reciprocated longitudinally of said axis by cam-mechanism so designed as to move the knife longitudinally at the same speed as the bar of stock during the cutting operation and to return the knife to an initial longitudinal position during its idle (i. e., non-cutting) period.

The bar of stock is preferably fed to the cutting position along a guide-channel, the end of which forms an abutment for the knife during the cutting operation. According to another feature of the invention, the said end is formed obliquely; the purpose of this arrangement is to enable the knife to co-operate accurately with the said end during the whole of its cutting movement. During this movement the cutting edge will be travelling longitudinally of the guide-channel and the oblique end is so shaped as to co-operate properly with the knife at each stage.

A specific embodiment of the present invention will now be described by way of example, with reference to the accompanying drawings, in which:—

Figure 1:
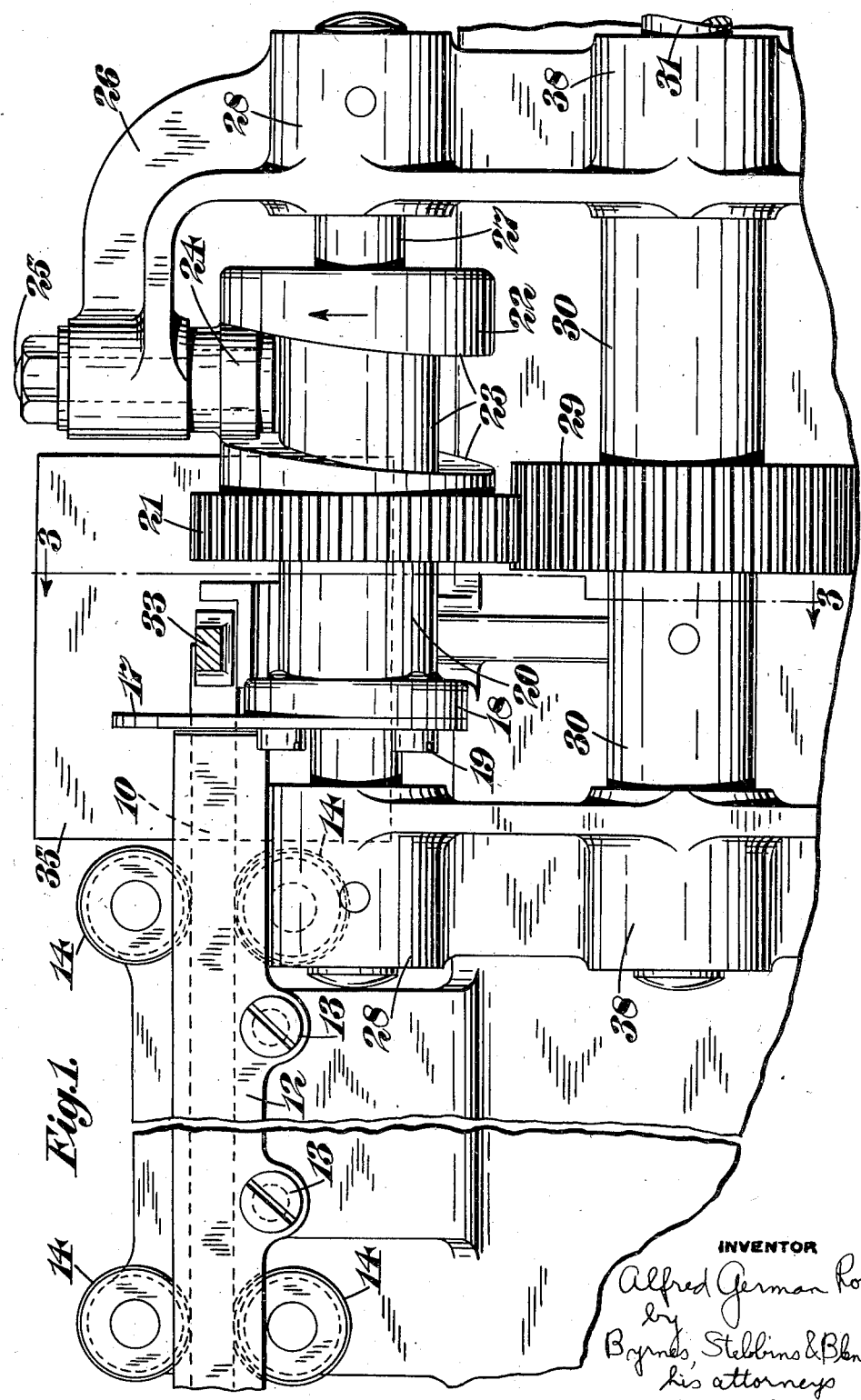
Figure 1 is an elevation of part of a machine incorporating mechanism according to the present invention.
Figure 2:
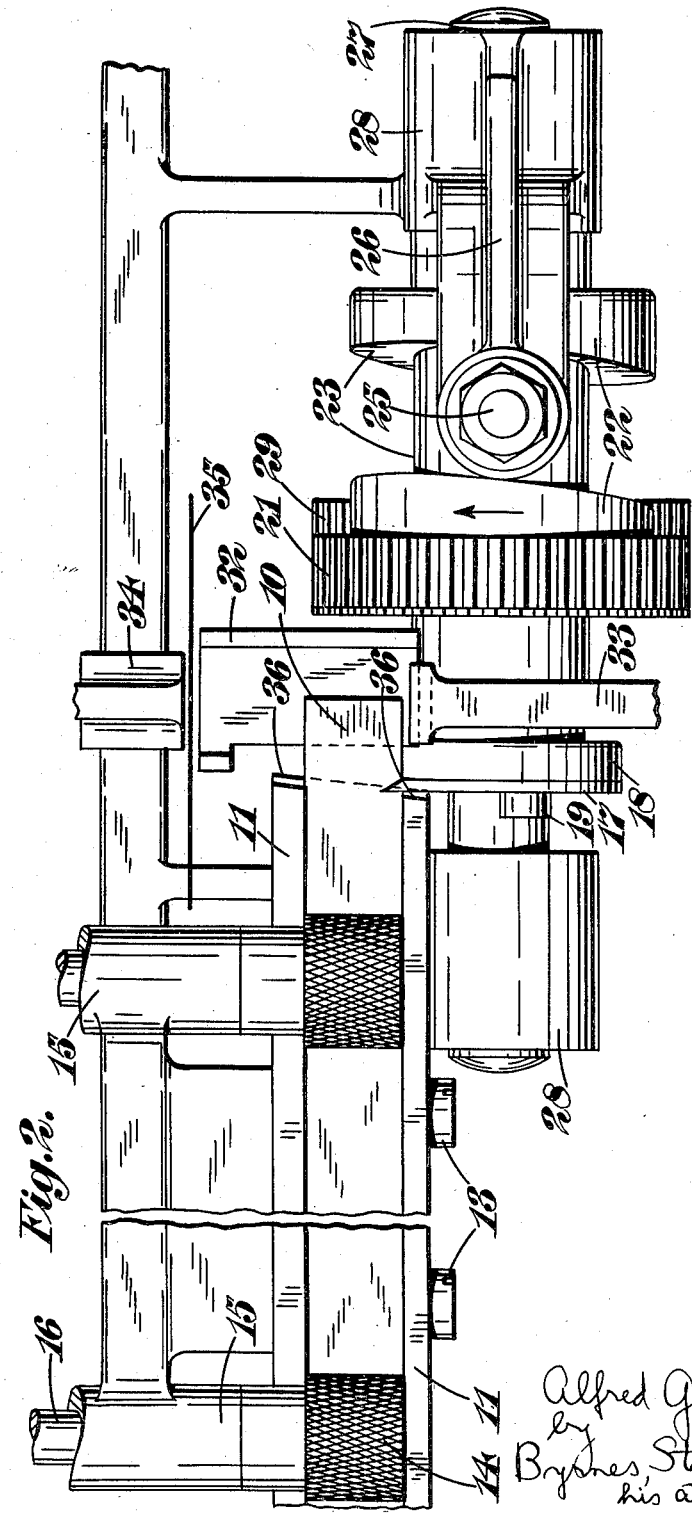
Figure 2 is a plan corresponding to Figure 1.

As shown in the drawings, a bar 10 of stock which may be plastic toffee or other material, to be cut into short lengths and subsequently wrapped and packed, is guided in a channel having vertical walls 11 and a bottom 12. The channel is affixed to the frame of the machine by screws 13. The bar 10 is fed to the right, as seen in Figure 1, by friction rollers 14 of which four are illustrated, two above the bar and two below. Those below the bar are received in suitable slots in the bottom of the channel 12 to enable their peripheries to engage the bar. Each roller 14 is mounted in an appropriate bearing boss 15 formed integrally with the frame of the machine and all the rollers are driven through appropriate gearing and their shafts 16 so as to feed the bar continuously forward to the cutting position.

Near to the end of the channel 11, 12 is a knife-blade 17 affixed to a boss 18 by screws 19, the boss 18 being formed with a tubular shaft 20 and a gear-wheel 21. The gear-wheel 21 carries on its other side a sleeve 22 of larger diameter than the shaft 20 and the sleeve 22 is cut around its periphery with a deep square-sectioned groove 23, the shape and function of which are more fully described below. Co-operating with the groove 23 is a roller 24 mounted to rotate freely on an axle 25 which is supported on an arm 26 of the machine frame.

The knife-blade, shaft 20, gear 21 and sleeve 22 rotate as one about a fixed axle 27 held in bosses 28 and are driven by a driving gear 29 which meshes with the gear 21 aforesaid and is carried on a tubular shaft 30 keyed to a driving shaft 31 to which power is applied by any convenient means. The shaft 31 is borne in bosses 38 formed on the machine frame. It will be seen that the teeth on the driving gear 29 are longer than the teeth of the gear 21 to accommodate the endwise movement of the gear 21 referred to below.

The parts are shown in the several figures in the position at which the knife 17 is about to engage the bar 10 to sever it. As the knife rotates in the direction of the arrows shown in the drawings, it makes contact with the bar 10 which, as has already been explained, is being continuously advanced towards the knife. However, the cam-shot 23 in the sleeve 22 co-operates with the roller 24 in such manner that, as the knife cuts through the bar, the whole assembly 18, 20, 21 and 22 is advanced to the right at exactly the same speed as the speed of movement of the bar. Thus, the bar is severed along a plane at right-angles to its length, in spite of the fact that it is continuously moving longitudinally. Where the shaft 31 and the rollers 14 are being driven at uniform speed, the condition for the knife to advance longitudinally at the same speed as the bar is that the part of the cam-slot 23 in contact with the roller 24 at that time should have the shape of an ordinary square-sectioned helical thread. The exact shape of the remaining part of the cam-slot 23 is unimportant provided it is designed so as to return the knife and associated parts to their initial position during the period after the knife-blade has passed through the bar of stock and before the knife edge reaches the bar again for its next succeeding cut.

The gear-wheel 21 is reciprocated longitudinally, together with its associated parts, but it remains in mesh with the non-reciprocated driving-gear 29 by reason of the extra length of the teeth on the gear 29.

When a length of the bar 10 has been cut off it is pushed on to a guide-plate 32 by the rest of the bar behind it and is ejected by a plunger 33 into the jaws 34 of a mould-wheel of known construction. In passing into the jaws the length of stock entrains a sheet of wrapping material 35. The succeeding operations in the wrapping of the article need not be described and form no part of the present invention.

Figure 3:
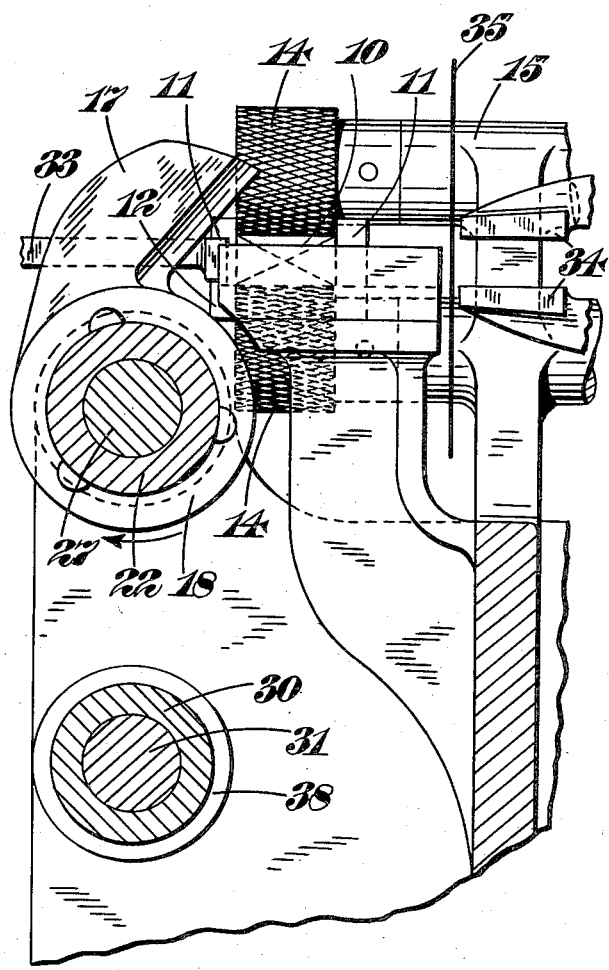
Figure 3 is a sectional elevation on the line 3—3 of Figure 1.

The abutment against which the knife operates in cutting through the bar of stock, is afforded by the inner end 36 of the guide-channel 11, 12 and to accommodate for the longitudinal component of the movement of the knife, the end 36 terminates at an oblique angle, as shown in Figure 3, so that as the knife advances to the right the edge of the channel with which it cooperates at any moment is in the correct abutting position.

It will be seen that by the present invention, a succession of separate blocks of plastic toffee, or other stock, can be severed from the bar without the advancing movement of the bar having to be interrupted or retarded.

The invention is not limited in its scope to the use of a knife of the kind shown in the accompanying drawings. For example, an eccentrically mounted cutting disc could be used instead. Moreover, the design of the cam-mechanism, the arrangement of the feed rollers and other details, could be modified as desired to suit special requirements.

I claim:

1. Mechanism for feeding and cutting a bar of stock comprising means for continuously advancing the bar into a cutting position, a cutting edge movable transversely of the bar for the cutting off a length of the stock, means for advancing the cutting edge longitudinally of the bar at the same speed as, and in the same direction as, its direction of movement, during the cutting operation, and a guide channel for said bar having an oblique end to cooperate with the cutting edge during the cutting operation.

2. Mechanism for feeding and cutting a bar of stock comprising means for continuously advancing the bar into a cutting position, a cutting edge movable transversely of the bar for cutting off a length of stock, means for advancing the cutting edge longitudinally of the bar and in the same direction as its direction of movement during the cutting operation, means for returning the cutting edge to an initial position longitudinally of the bar, during the idle period of the cutting edge, and a guide channel for said bar having an oblique end to cooperate with the cutting edge during the cutting operation.

3. Mechanism for feeding and cutting a bar of stock comprising means for continuously advancing the bar into a cutting position, a knife rotatable about an axis parallel to the bar of stock so as to cut through the bar, means for advancing the knife longitudinally of the bar in the same direction as its direction of movement and at the same speed as its speed of movement, during the cutting operation, and a guide channel for said bar having an oblique end to cooperate with the cutting edge during the cutting operation.

4. Mechanism for feeding and cutting a bar of stock comprising means for continuously advancing the bar into a cutting position, a knife rotatable about an axis lying parallel to the bar of stock, means for rotating the knife to cut off a length of stock, cam-mechanism for reciprocating said knife longitudinally of the bar, said reciprocation being in the same direction as the direction of movement of the bar during the cutting operation and in the opposite direction during the idle period of the knife, and a guide channel for said bar having an oblique end to cooperate with the cutting edge during the cutting operation.

5. Mechanism for feeding and cutting a bar of stock comprising means for continuously advancing a bar into a cutting position, a knife rotatable about an axis parallel with said bar, a tubular shaft connected to said knife to rotate it, a gear on said shaft, a driving gear meshing therewith, cam-mechanism operative on said tubular shaft to reciprocate it in the same direction as the movement of the bar, during the cutting operation and in the reverse direction during the idle period of the knife, wherein the teeth of one or both of said interengaging gears are of sufficient length to accommodate the aforesaid reciprocating movement of the tubular shaft gear.

6. Mechanism for feeding and cutting a bar of stock comprising a guide channel along which the bar is fed, means for continuously advancing the bar along said guide channel into a cutting position, a cutting edge mounted for movement in a plane transversely of the bar for cutting off a length of stock, and means for advancing the cutting edge longitudinally of the bar, in the same direction as its direction of movement, during the cutting operation, wherein the guide channel is formed with an oblique end to cooperate with the cutting edge during the cutting operation.

7. Mechanism for feeding and cutting a bar of stock comprising means for continuously advancing a bar into a cutting position, a knife rotatable about an axis parallel with said bar, a tubular shaft connected to said knife to rotate it, a gear on said shaft, a driving gear meshing therewith, cam-mechanism operative on said tubular shaft to reciprocate it in the same direction and at the same speed as the movement of the bar, during the cutting operation and in the reverse direction during the idle period of the knife, wherein the teeth of one or both of said interengaging gears are of sufficient length to accommodate the aforesaid reciprocating movement of the tubular shaft gear.

8. Mechanism for feeding and cutting a bar of stock comprising means for continuously advancing a bar into a cutting position, a cutting edge rotatable about an axis parallel with said bar, a tubular shaft connected to said cutting edge to rotate it, a gear on said shaft, a driving gear meshing therewith, means operative on said tubular shaft to reciprocate it in the same direction as the movement of the bar, during the cutting operation and in the reverse direction during the idle period of the cutting edge, wherein the teeth of one or both of said interengaging gears are of sufficient length to accommodate the aforesaid reciprocating movement of the tubular shaft gear.

9. Mechanism for feeding and cutting a bar of stock comprising means for continuously advancing the bar into a cutting position, a cutting edge movable transversely of the bar for the cutting off a length of the stock, means for advancing the cutting edge longitudinally of the bar at the same speed as, and in the same direction as, its direction of movement, during the cutting operation, and a guide channel having an oblique end portion slanting in the direction of the movement of the bar from the position where the cutting edge contacts the end portion of the channel to the opposite edge of the channel, whereby the guide channel end portion cooperates with the knife during the whole of the cutting operation.

ALFRED GERMAN ROSE.